United States Patent
Watanabe et al.

(10) Patent No.: US 11,627,234 B2
(45) Date of Patent: Apr. 11, 2023

(54) POST-PROCESSING DEVICE, IMAGE FORMING DEVICE, ADJUSTMENT METHOD FOR POST-PROCESSING DEVICE, AND RECORDING MEDIUM

(71) Applicant: Konica Minolta, Inc., Tokyo (JP)

(72) Inventors: Masayuki Watanabe, Fuchu (JP); Hidenori Mine, Tachikawa (JP); Satoshi Ogata, Tokyo (JP); Kazutoshi Yoshimura, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/382,797

(22) Filed: Jul. 22, 2021

(65) Prior Publication Data

US 2022/0046142 A1    Feb. 10, 2022

(30) Foreign Application Priority Data

Aug. 4, 2020   (JP) .............................. JP2020-132087

(51) Int. Cl.
*H04N 1/32*    (2006.01)
*G06F 3/12*    (2006.01)
*H04N 1/00*    (2006.01)

(52) U.S. Cl.
CPC ....... *H04N 1/32587* (2013.01); *G06F 3/1204* (2013.01); *G06F 3/1265* (2013.01); *G06F 3/1279* (2013.01); *H04N 1/00013* (2013.01); *H04N 1/00018* (2013.01); *H04N 1/00026* (2013.01)

(58) Field of Classification Search
CPC ........... H04N 1/32587; H04N 1/00013; H04N 1/00018; H04N 1/00026; G06F 3/1204; G06F 3/1265; G06F 3/1279
See application file for complete search history.

(56) References Cited

U.S. PATENT DOCUMENTS

2006/0238786 A1    10/2006   Sakura et al.
2019/0193980 A1*   6/2019    Kiriyama ........... G03G 21/1604

FOREIGN PATENT DOCUMENTS

| JP | 2006-321000 A | 11/2006 |
|---|---|---|
| JP | 2008-023665 A | 2/2008 |
| JP | 2016-097612 A | 5/2016 |
| JP | 2019-043752 A | 3/2019 |
| JP | 2019-045784 A | 3/2019 |
| JP | 2019-63966 A | 4/2019 |
| JP | 2019-072915 A | 5/2019 |

OTHER PUBLICATIONS

Extended European Search Report issued in corresponding European Patent Application No. EP 21182807.4 dated Dec. 15, 2021 (5 pages).

* cited by examiner

*Primary Examiner* — Moustapha Diaby
(74) *Attorney, Agent, or Firm* — Osha Bergman Watanabe & Burton LLP (57) ABSTRACT

A post-processing device includes: multiple types of post-processing modules that are disposed at predetermined installation positions within the post-processing device and each execute post-processing to an output sheet on which an image is formed; and a controller that (i) detects the post-processing modules at the installation positions and (ii) determines and controls adjustment contents of the post-processing modules based on a detection result.

17 Claims, 8 Drawing Sheets

POST-PROCESSING DEVICE, IMAGE FORMING DEVICE, ADJUSTMENT METHOD FOR POST-PROCESSING DEVICE, AND RECORDING MEDIUM

CROSS-REFERENCE TO RELATED APPLICATIONS

The entire disclosure of Japanese patent application No. 2020-132087, filed on Aug. 4, 2020, is incorporated herein by reference.

BACKGROUND

1. Technical Field

The present invention relates to a post-processing device, an image forming device, an adjustment method for the post-processing device, and a recording medium.

2. Description of the Related Art

Conventional post-processing devices perform post-processing, such as cutting processing, crease processing, and perforation processing, on a sheet on which an image is formed by an image forming device.

To perform post-processing, image formation and post-processing are required to have high accuracy in positions. Therefore, processing positions are revised in post-processing devices (JP2006-321000A, JP2019-63966A, JP2008-023665A, JP2019-072915A, JP2019-045784A, and JP2019-043752A).

There is a case where device configuration having functions of executing processing, such as cutting processing, crease processing, and perforation processing, is modularized and where modules are selectively installed in a main body of a post-processing device. In that case, a user selects post-processing modules for post-processing to be applied to an output product of an image. The user installs the modules. Image formation and post-processing must be performed after adjustment processing is performed for the post-processing modules.

Adjustment items vary depending on functions of selected post-processing modules. Therefore, each adjustment item needs to be adjusted individually. It takes time and effort.

Further, some adjustment items must be adjusted in order. If they are adjusted in wrong order, it will take more time.

SUMMARY

The present invention relates to a post-processing device in which post-processing modules selected for post-processing to be applied to an output product of an image can be freely installed. One or more embodiments of the present invention efficiently and appropriately adjust configuration of the post-processing device, the configuration being made by the selection and the installation.

According to one or more embodiments of the present invention, a post-processing device in which post-processing modules selected for post-processing to be applied to an output product of an image are installed includes:

a controller which (i) recognizes (or detects) post-processing modules that are installed and (ii) determines and controls adjustment contents based on recognition (or a detection result).

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described in detail with reference to the drawings. However, the scope of the invention is not limited to the disclosed embodiments.

Overview of Image Forming Device

Figure 1:
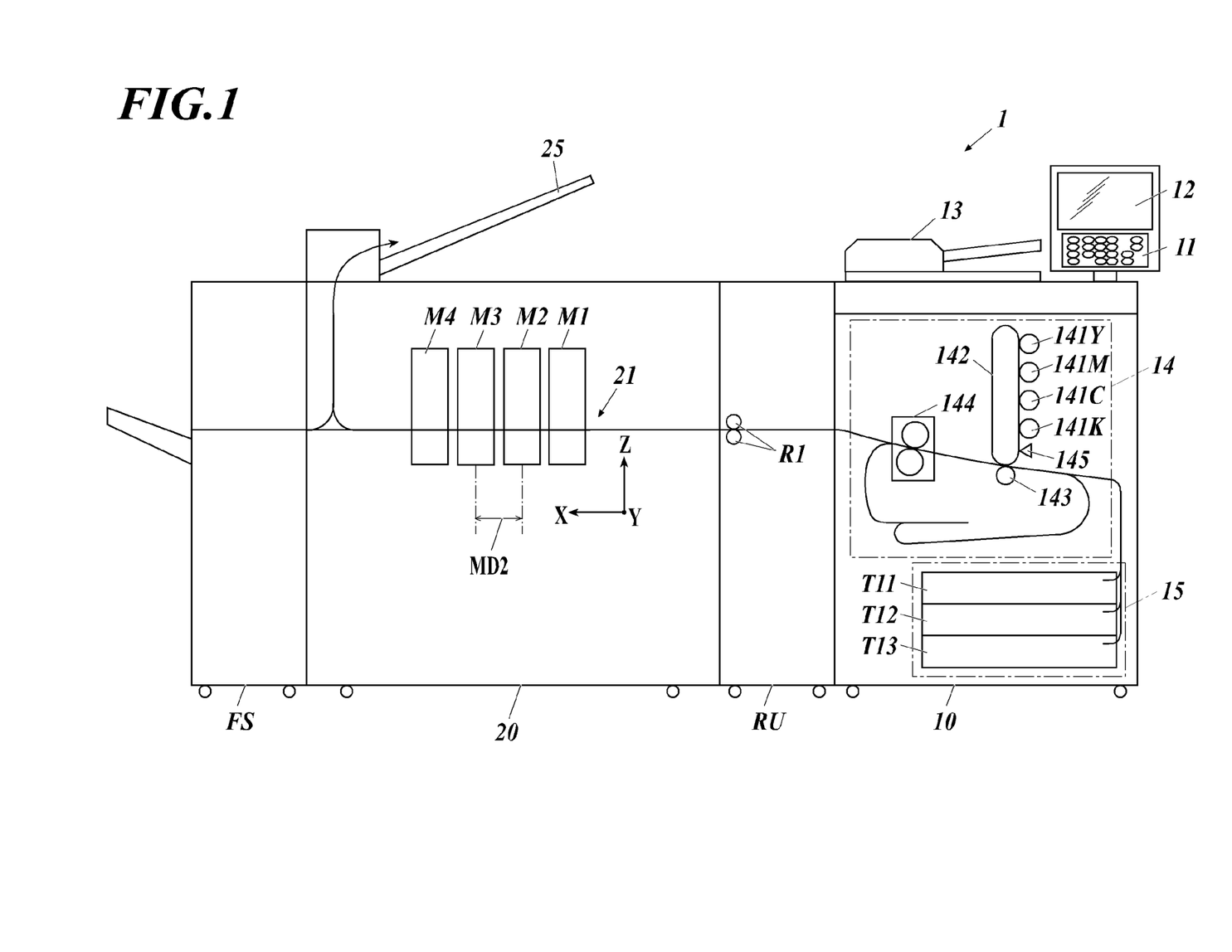
FIG. 1 shows schematic configuration of an image forming device according to one or more embodiments.
Figure 2:
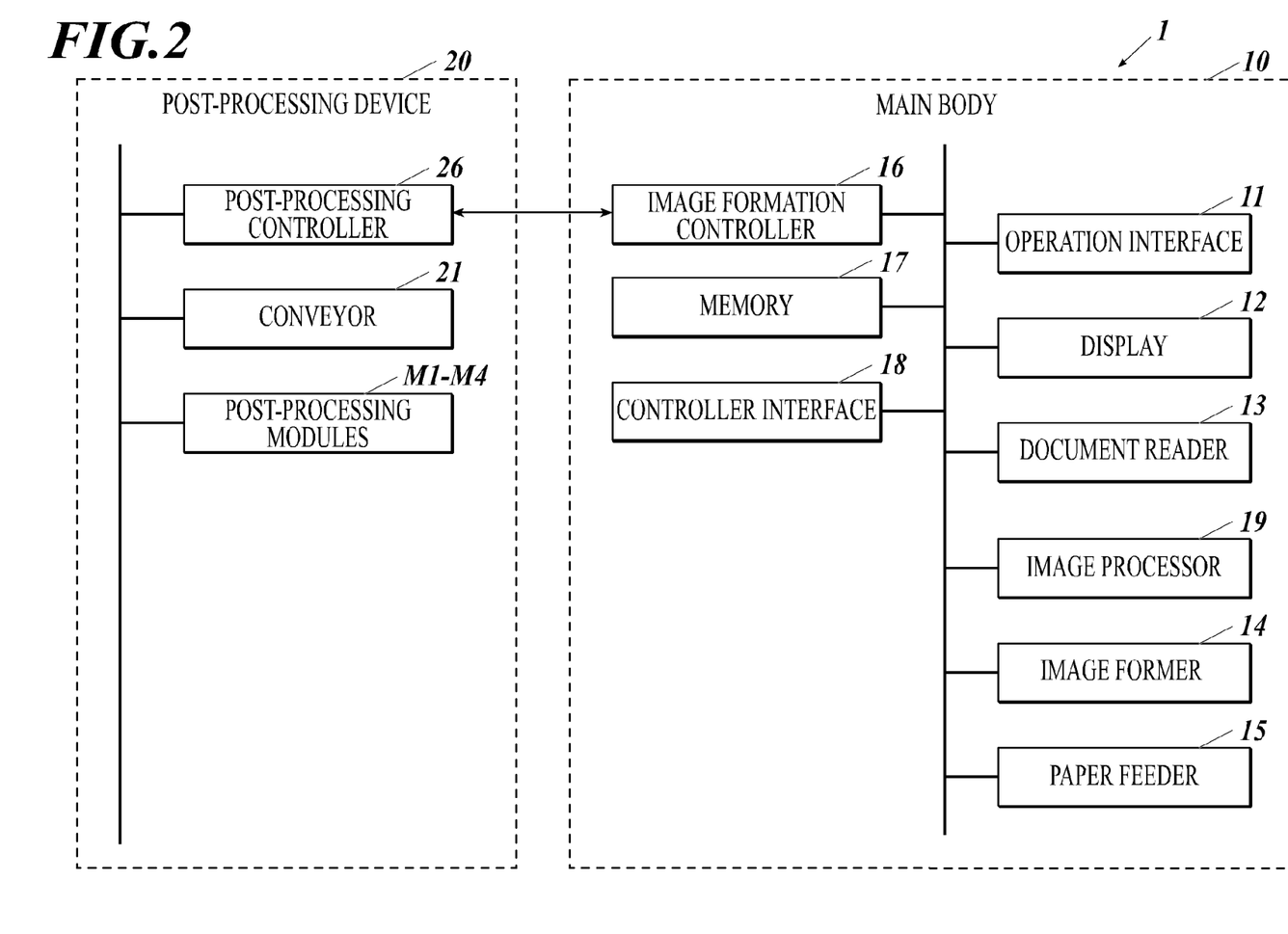
FIG. 2 is a functional block diagram showing a control structure of the image forming device according to one or more embodiments.

As shown in FIGS. 1 to 2, the image forming device 1 according to one or more embodiments includes a main body 10, a relay unit RU, a post-processing device 20 as a sheet conveyance device, and a finisher FS.

The main body 10 forms a color image in an electrophotographic method based on image data obtained by reading an image in a document or image data received from an external device. Paper ejection rollers R1 ejects a sheet on which an image is formed to the relay unit RU.

As shown in FIGS. 1 to 2, the main body 10 includes an operation interface 11, a display 12, a document reader 13, an image former 14, a paper feeder 15, an image formation controller 16, memory 17, a controller interface 18, and an image processor 19.

The operation interface 11 includes a touch panel that covers a display screen of the display 12, as well as various operation buttons such as number buttons and a start button. The operation interface 11 outputs operation signals based on operation of a user to the image formation controller 16.

The display 12 is constituted by an LCD (liquid crystal display). The display 12 displays various screens according to commands of display signals input from the image formation controller 16.

The document reader 13 includes an ADF (automatic document feeder) and a scanner. The document reader 13 outputs image data obtained by reading an image in a document to the image formation controller 16.

The image former 14 forms an image on a sheet supplied by the paper feeder 15 based on image data processed by the image processor 19.

The image former 14 includes photosensitive drums 141Y, 141M, 141C, 141K corresponding to colors of yellow (Y), magenta (M), cyan (C), and black (K), an intermediate transfer belt 142, a secondary transfer roller 143, and a fixing unit 144.

The photosensitive drum 141Y is uniformly charged. Then, the photosensitive drum 141Y is scanned and exposed by a laser beam based on yellow image data. Thereby an electrostatic latent image is formed. A yellow toner is put on the electrostatic latent image on the photosensitive drum 141Y. Development is performed.

The photosensitive drums 141M, 141C, 141K are also treated like the photosensitive drum 141Y, except that colors are different. Explanation is omitted.

Toner images of colors formed on the photosensitive drums 141Y, 141M, 141C, 141K are transferred onto the rotating intermediate transfer belt 142 one by one (primary transfer). Thus, a color toner image in which four color toner images are piled is formed on the intermediate transfer belt 142.

The secondary transfer roller 143 transfers the color toner image on the intermediate transfer belt 142 onto a sheet at once (secondary transfer).

The fixing unit 144 includes a heat roller that heats a sheet on which a color toner image is transferred, and a pressure roller that presses the paper. The fixing unit 144 fixes the color toner image on the sheet by heating and pressing.

The paper feeder 15 includes paper feed trays T11-T13, and supplies sheets to the image former 14. Each of the paper feed trays T11-T13 stores paper of a type and size predetermined for the paper feed tray.

The image formation controller 16 includes a CPU, ROM, and memory.

The CPU reads various processing programs stored in the ROM. The programs include an adjustment program of the post-processing device (the same applies hereinafter). The CPU comprehensively controls operation of parts of the main body 10 according to the program. In a case where post-processing is performed on an output sheet, the CPU orders the post-processing device 20 to perform predetermined post-processing.

The ROM is constituted by non-volatile semiconductor memory or the like. The ROM stores various processing programs as well as parameters and files necessary for executing the programs.

The memory is constituted by DRAM (dynamic random access memory) or the like. The memory temporarily stores various data such as programs and image data for image processing of various kinds.

The memory 17 is non-volatile memory, such as an HDD (hard disk drive) or semiconductor memory, which stores programs and various data such as image data. The memory 17 stores data such as program data and various setting data. The image formation controller 16 can read and write the data.

The controller interface 18 receives image data input from an external device.

The image processor 19 performs necessary image processing on:
image data stored in the memory 17;
image data obtained by reading an image in a document with the document reader 13; and
image data input from an external device.

After the image processing, the image processor 19 transmits image data to the image former 14. Image processing includes gradation processing, halftone processing, and color conversion processing. The gradation processing converts gradation values of pixels in image data into revised gradation values so that a density characteristic of an image formed on a sheet meets a target density characteristic. The halftone processing is error diffusion processing, screen processing in an ordered dither method, or the like. The color conversion processing converts gradation values in RGB into gradation values in CMYK.

The relay unit RU is placed between the main body 10 and the post-processing device 20. The relay unit RU has a function of synchronizing with a conveyance speed of a sheet conveyed from the main body 10.

The post-processing device 20 performs post-processing on a sheet carried out of the relay unit RU as needed. Post-processing includes, for example, slitting processing, margin slitting processing, CD (cross direction) cutting processing, crease processing (upward convex or downward convex), FD (feed direction) perforation processing, and CD perforation processing. Post-processing is not mandatory. The post-processing device 20 performs post-processing only when ordered by the main body 10. In a case where no post-processing is performed, the post-processing device 20 conveys a received sheet directly to the finisher FS.

As shown in FIGS. 1 to 2, the post-processing device 20 includes a conveyor 21, multiple types of post-processing modules M1-M4 that are disposed at predetermined installation positions within the post-processing device 20 and each execute same or different post-processing to an output sheet on which an image is formed, a discharge tray 25 onto which sheets discharged from the post-processing device 20 are loaded, and a post-processing controller 26.

The conveyor 21 conveys sheets conveyed from the relay unit RU to the post-processing modules M1-M4. The conveyor 21 then conveys a sheet on which post-processing is performed in the post-processing modules M1-M4 to various trays (including the discharge tray 25) or the finisher FS.

The post-processing modules M1-M4 perform post-processing on the conveyed sheet.

Post-processing modules selected for post-processing to be performed on an output product (i.e., output sheet), on which an image is formed by the image former 14, can be freely installed in the post-processing device 20. The controllers 16, 26 recognize the types of post-processing devices installed in installation parts of the post-processing modules M1-M4 (hereinafter, the installation parts are referred to as "slots", and the same reference numerals as those of modules are used). For example, a slitter is installed in the most upstream post-processing module M1. A downward convex creaser is installed in the post-processing module M2. A margin slitter is installed in the post-processing module M3. The downward convex creaser performs crease processing of forming a downwardly protruding streak on a sheet. The margin slitter cuts (a margin of) a sheet at the center in a cross direction (sheet width direction Y). The controllers 16, 26 recognize the types and installation positions of the installed post-processing modules (in the above case, the slitter in the slot M1, the downward convex creaser in the slot M2, and the margin slitter in the slot M3).

The most downstream post-processing module M4 is a CD cutter which cuts a sheet in the cross direction (sheet width direction Y) and which is permanently fixed in the device. Freely selected post-processing modules are installed in the slots M1-M3.

Post-processing modules include, in addition to the above ones, an upward convex creaser, an FD sewing machine, and a CD sewing machine. The upward convex creaser performs crease processing of forming an upwardly protruding streak on a sheet. The FD sewing machine makes perforations in a feed direction (sheet conveyance direction X) on a sheet. The CD sewing machine makes perforations in the cross direction (sheet width direction Y) on a sheet.

Adjustment of Post-Processing Device

An adjustment method for the post-processing device will be described below. An adjustment program and hardware (or computer) of the post-processing device realizes the adjustment method according to one or more embodiments.

Adjustment contents in the post-processing device 20 includes adjustment items of:

offset adjustment of a position to stop post-processing;

tilt adjustment (revision of a bend of sheet conveyance in steering time);

revision of a cutting position in the cross direction (at cutting time);

revision of slit positions at both edges (bend revision, and revision of a position in the feed direction);

revision of a slit position in margin cutting (bend revision, revision of a position in the feed direction, and revision of a distance in margin cutting);

revision of a crease position (bend revision, and position revision by timing);

revision of a position of perforation in the feed direction (bend revision, and revision of a position in the feed direction); and revision of a position of perforation in the cross direction (bend revision, and position revision by timing).

In a case where the controllers 16, 26 determine that a user has replaced a post-processing module in the post-processing device 20 based on recognition of types and installation positions of the post-processing modules, the controllers 16, 26 determine necessary adjustment items and adjustment order according to configuration of types of the installed post-processing modules and installation positions. The controllers 16, 26 determine at least one of need for guidance, a guidance method, and guidance contents. Even when a combination of post-processing modules does not change, if installation positions change, sometimes adjustment items also change.

The controllers 16, 26 determine and perform adjustment items necessary for modules based on a combination of post-processing modules and installation positions. It prevents malfunctions due to lack of adjustment.

Even after modules are adjusted, if a combination is changed (i.e., modules to be combined are changed), additional adjustment is sometimes required. Also in that case, the controllers 16, 26 determine and perform additional adjustment items that become necessary. It prevents malfunctions due to lack of adjustment.

After determining necessary adjustment items, adjustment order, guidance contents, etc., the controllers 16, 26 display the necessary adjustment items on the display 12 in the adjustment order. The controllers 16, 26 give guidance on the adjustment method so that a user can make necessary adjustment.

The controllers 16, 26 recognize types and installation positions of post-processing modules after replacement, for example:

a slitter in the slot M1;

a downward convex creaser in the slot M2; and a margin slitter in the slot M3.

Figure 3:
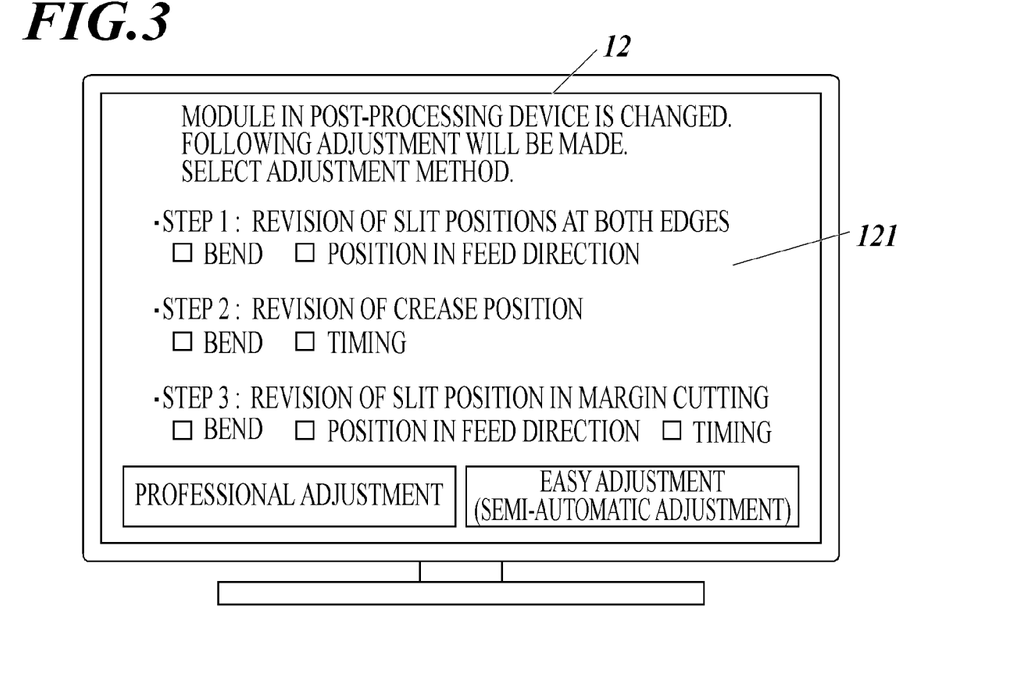
FIG. 3 is a front view of a display on which an adjustment menu screen according to one or more embodiments is displayed.

In that case, as shown in FIG. 3, the controllers 16, 26 display an adjustment menu screen 121 including adjustment items on the display 12. The controllers 16, 26 provide guidance to a user on the adjustment method.

Professional Adjustment

In a case where "PROFESSIONAL ADJUSTMENT" is selected by operation of a user on the adjustment menu screen 121 in FIG. 3, the controllers 16, 26 make the image former 14 print an adjustment chart on a sheet. The adjustment chart suits the professional adjustment corresponding to the recognition. Thus, the controllers 16, 26 add output of an image of the adjustment chart to adjustment contents determined based on the above recognition. The adjustment chart corresponds to a combination of post-processing modules according to the recognition. The controllers 16, 26 control this.

Next, the controllers 16, 26 make the post-processing device 20 receive output sheet of the adjustment chart from the image former 14. The controllers 16, 26 make the post-processing device 20 perform necessary post-processing in the modules M1-M4. In one or more embodiments, the post-processing is performed with existing adjustment values.

A user refers to an adjustment chart sheet on which post-processing is performed as described above. The user checks result of post-processing and operates the operation interface 11, etc. to make necessary adjustment. An example of the operation is as follows.

Figure 4:
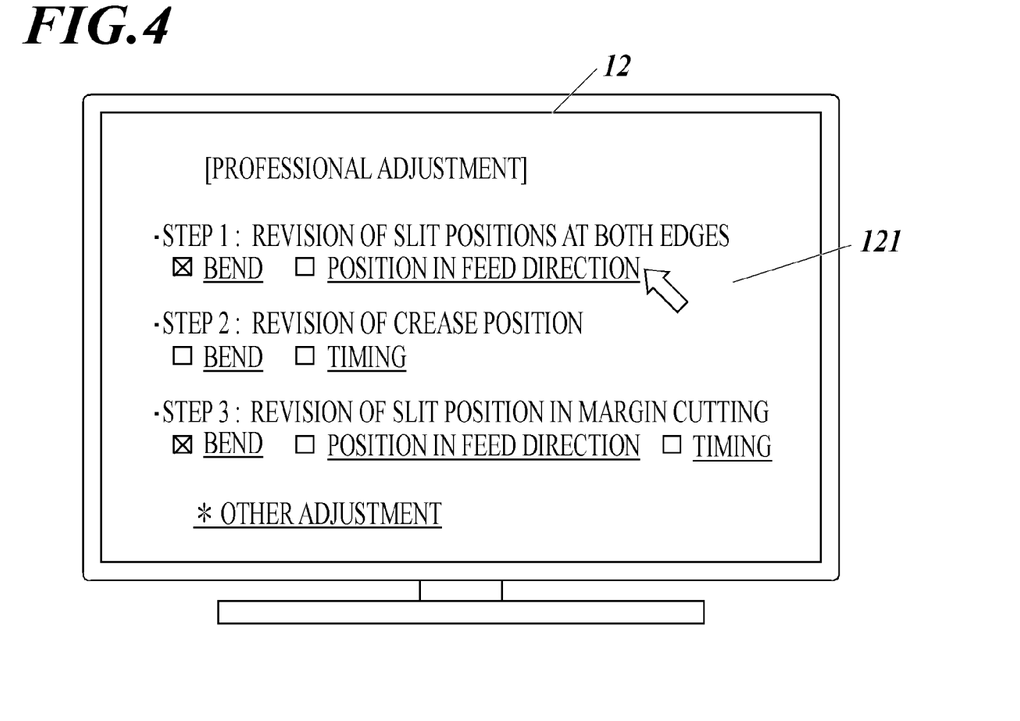
FIG. 4 is a front view of the display on which a guidance screen for professional adjustment according to one or more embodiments is displayed.
Figure 5:
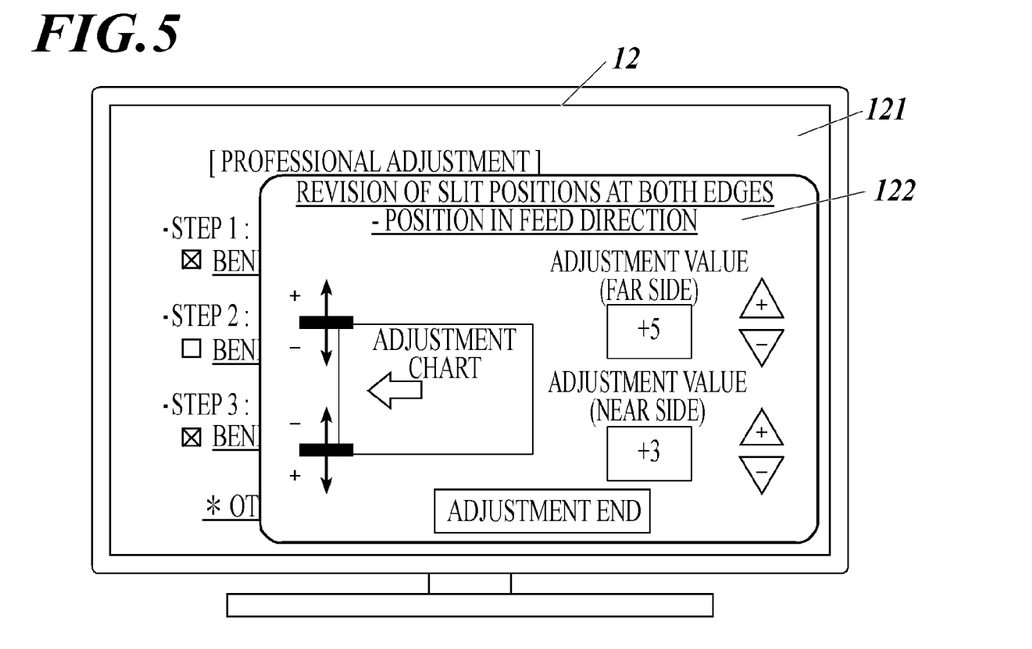
FIG. 5 is a front view of the display on which an adjustment operation panel screen according to one or more embodiments is displayed.

FIG. 4 shows an example of a guidance screen for the professional adjustment. A user checks an adjustment chart. The user selects items that need adjustment and makes adjustment. For example, the user selects "POSITION IN FEED DIRECTION" below the item "REVISION OF SLIT POSITIONS AT BOTH EDGES" in FIG. 4 in a case where it is necessary to adjust a position in the feed direction, which is included in the revision of slit positions at both edges. In response to the selection, for example, the controllers 16, 26 pop up an adjustment operation panel screen 122 as shown in FIG. 5 so that adjustment values can be changed by operation of the user.

As shown in FIG. 4, the controllers 16, 26 checks an adjusted item ("☒"). Thus, the controllers 16, 26 control display on the adjustment menu screen 121 such that adjusted items are recognized. In a case where there are items that do not need to be adjusted, the controllers 16, 26 control display such that "☐" turns into "☒" when the user presses "☐". If all adjustment items are checked ("☒"), it means that the whole adjustment is completed.

Easy Adjustment

In easy adjustment, semi-automatic adjustment is performed. Adjustments are made with guidance so that even a beginner can easily make adjustment.

In a case where "EASY ADJUSTMENT" is selected by operation of a user on the adjustment menu screen 121 in FIG. 3, the controllers 16, 26 make the image former 14 print an adjustment chart on a sheet. The adjustment chart suits the easy adjustment corresponding to the recognition. Thus, the controllers 16, 26 add output of an image of an adjustment chart to the adjustment contents determined based on the recognition. The adjustment chart corresponds to a combination of post-processing modules according to the recognition. The controllers 16, 26 control this.

Next, the controllers 16, 26 make the post-processing device 20 receive an output sheet of the adjustment chart from the image former 14. The controllers 16, 26 make the post-processing device 20 perform necessary post-processing in the modules M1-M4. In one or more embodiments, post-processing is performed with existing adjustment values.

Figure 6:
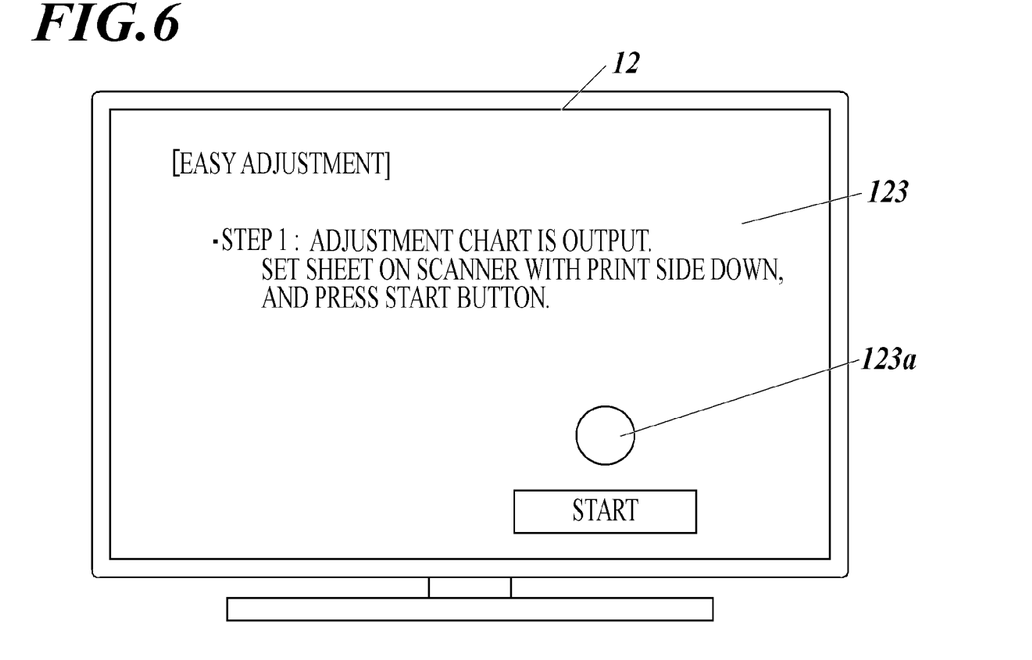
FIG. 6 is a front view of the display on which a guidance screen for easy adjustment according to one or more embodiments is displayed.

FIG. 6 shows an example of guidance display for the easy adjustment.

The controllers 16, 26 control display of a guidance screen 123 as shown in FIG. 6. The controllers 16, 26 prompt the user to read an adjustment chart on which post-processing is performed with the scanner of the image forming device. When a scan start button 123a is pressed, the controllers 16, 26 make the document reader 13 perform scanning. The controllers 16, 26 check result of post-processing based on a scanned image, and make necessary revision. That is, the controllers 16, 26 make the post-processing device 20 perform post-processing with existing adjustment values on an output product on which an image of an adjustment chart is output. After that, the controllers 16, 26 determine additional adjustment contents according to an image obtained by reading the output product with the scanner. The controllers 16, 26 control performance of the additional adjustment contents.

Figure 7:
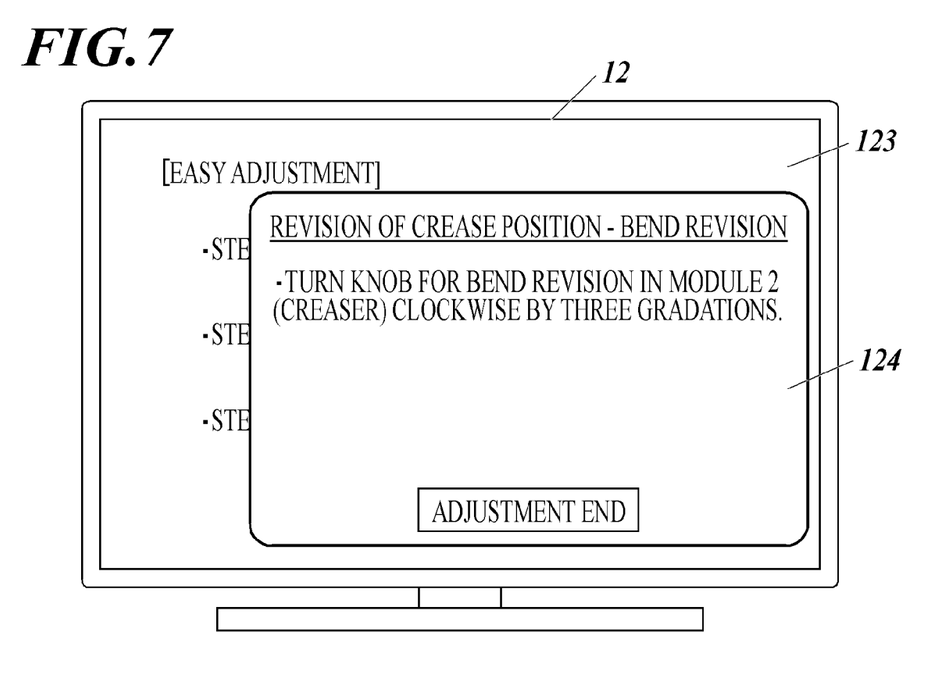
FIG. 7 is a front view of the display on which a bend revision guidance screen according to one or more embodiments is displayed.
Figure 8:
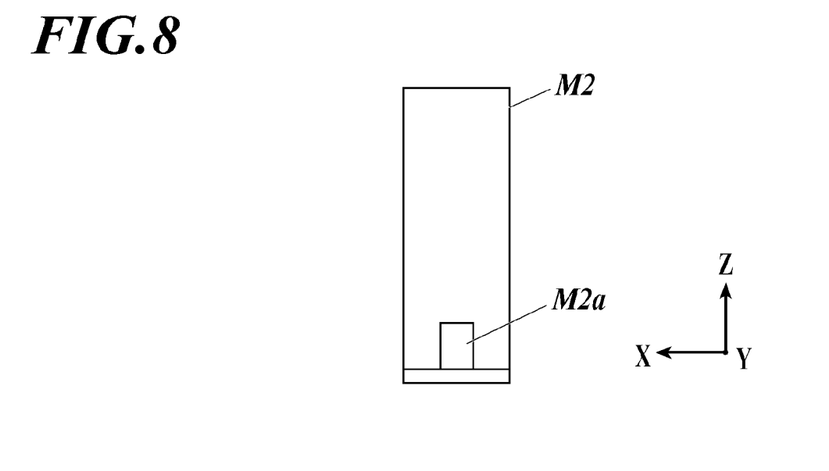
FIG. 8 is a front view of a post-processing module including a knob for bend revision according to one or more embodiments.
Figure 9:
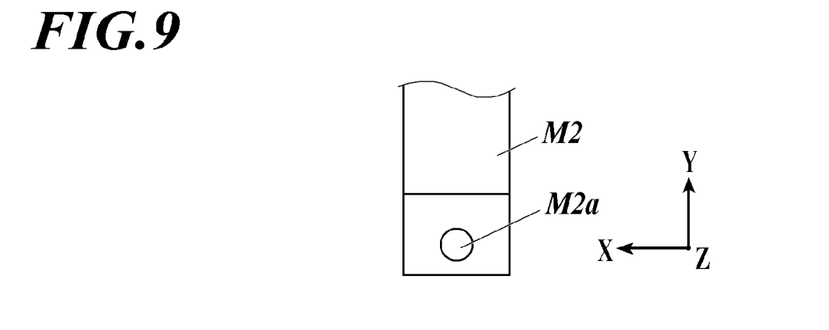
FIG. 9 is a partial top view of the post-processing module including the knob for bend revision according to one or more embodiments.
Figure 10:
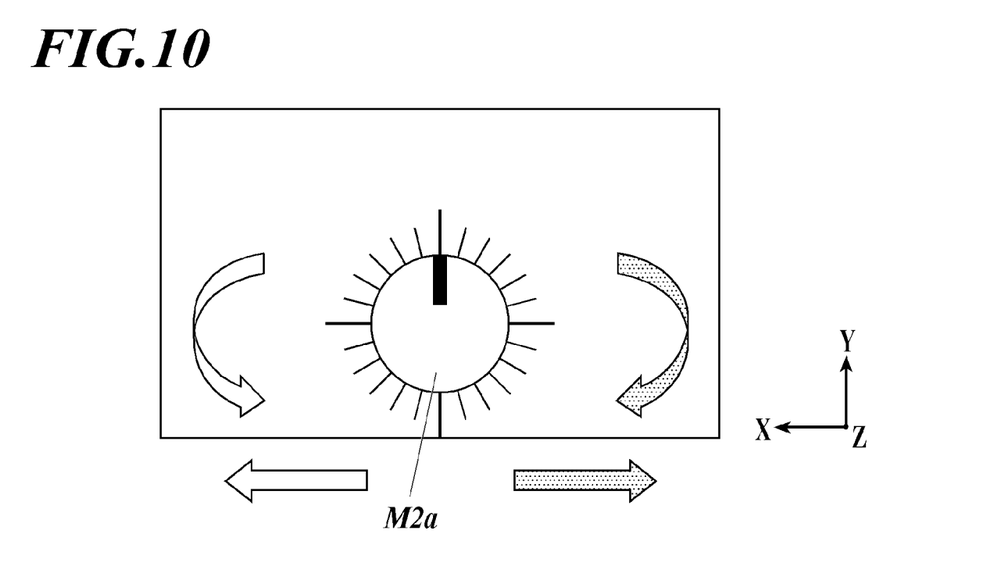
FIG. 10 is an enlarged view of a part of FIG. 9.

In a case where operation by a user, such as bend revision for a post-processing module, is required, the controllers 16, 26 display instructions on the display 12 such that a user can make appropriate revision. For example, in a case where user work of revising a bend of a creaser installed in the slot M2 is required, the controllers 16, 26 displays a guidance screen 124 with instruction, for example, "turn knob for bend revision in slot M2 (module 2) (M2a in FIGS. 8-10) clockwise by three gradations", on the display 12 as shown in FIG. 7. Thus the controllers 16, 26 guide revision. As described above, in the case where adjustment contents determined according to an image read by a scanner includes an item of mechanical adjustment that requires operation of a user, the controllers 16, 26 control guidance to a user on an adjustment method and adjustment values. The controllers 16, 26 control the adjustment contents, too.

The controllers 16, 26 automatically revise control values of the post-processing modules controlled by the controllers 16, 26, which are included in adjustment contents determined according to an image read by the scanner. The control value is, for example, the one in the revision of a position in the feed direction, which is included in the revision of slit positions at both edges.

After revision by the professional adjustment or the easy adjustment, output of an adjustment chart, post-processing, (image reading,) and check of result are repeated as necessary. Adjustment is performed until required accuracy in post-processing is achieved. The controllers 16, 26 provide guidance for re-adjustment on the display 12 (not shown).

Adjustment that Varies Depending on Combination

Depending on a combination of post-processing modules, the controllers 16, 26 sometimes make adjustment contents of at least one of post-processing modules different from others (or the remaining post-processing modules). Depending on a combination of the modules, adjustment items for modules are sometimes different.

For example, in view of adjustment items for a CD sewing machine, which is one of post-processing modules, basically two adjustments are made.

The two adjustments are:
bend adjustment for the module; and
adjustment of time to perform perforation processing in the cross direction from an edge of a sheet.

However, in a case where a CD sewing machine and a creaser are installed at the same time, in view of change in sheet length after crease processing by the creaser, it is necessary to make the adjustment of time to perform the perforation processing in the cross direction twice. That is, the adjustment must be made on a condition before the crease processing (crease processing is not done) and on a condition after crease processing (crease processing is done).

On the other hand, in a case where a creaser is not installed (creaser is not combined), it is sufficient to make the adjustment of time to perform the perforation processing in the cross direction with a CD sewing machine just once on the condition before crease processing (crease processing is not done).

Thus, adjustment contents of a CD sewing machine, which is one of post-processing modules, is changed in a case in which the module is combined with different post-processing modules (change in a combination of the CD sewing machine and other modules).

As described above, adjustment contents vary depending on a condition of combination. Therefore, proper adjustment suitable for a condition of combination is performed for one post-processing module.

Supplementary Explanation About Adjustment Chart

The controllers 16, 26 add output of an image of an adjustment chart to adjustment contents, the adjustment chart corresponding to a combination of post-processing modules. Since adjustment items for modules vary depending on a combination of post-processing modules, an adjustment sheet for adjustment varies. An example is shown below.

Figure 11:
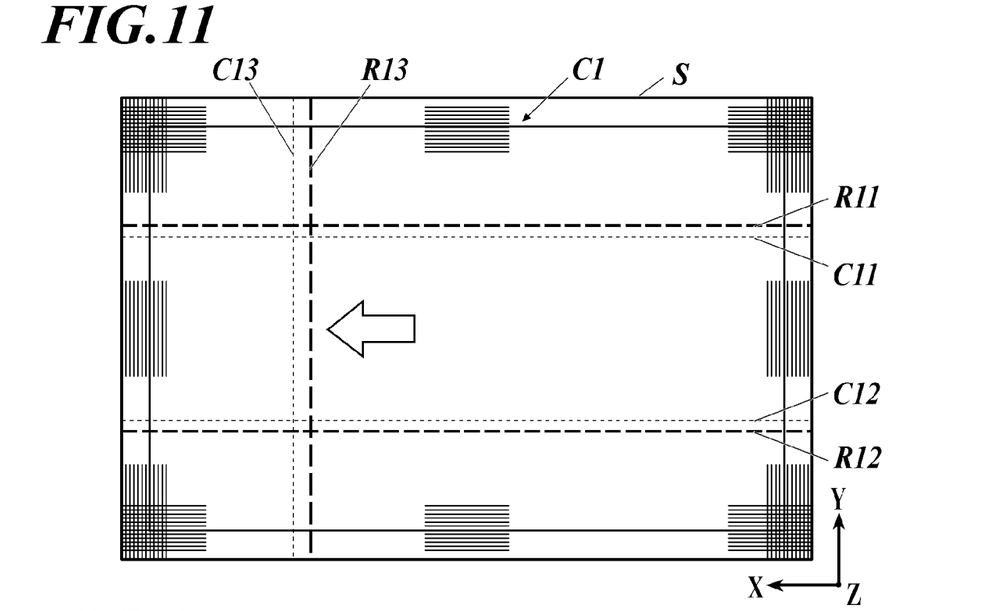
FIG. 11 is a plan view showing a sheet and an example of an adjustment chart output on the paper according to one or more embodiments.
Figure 12:
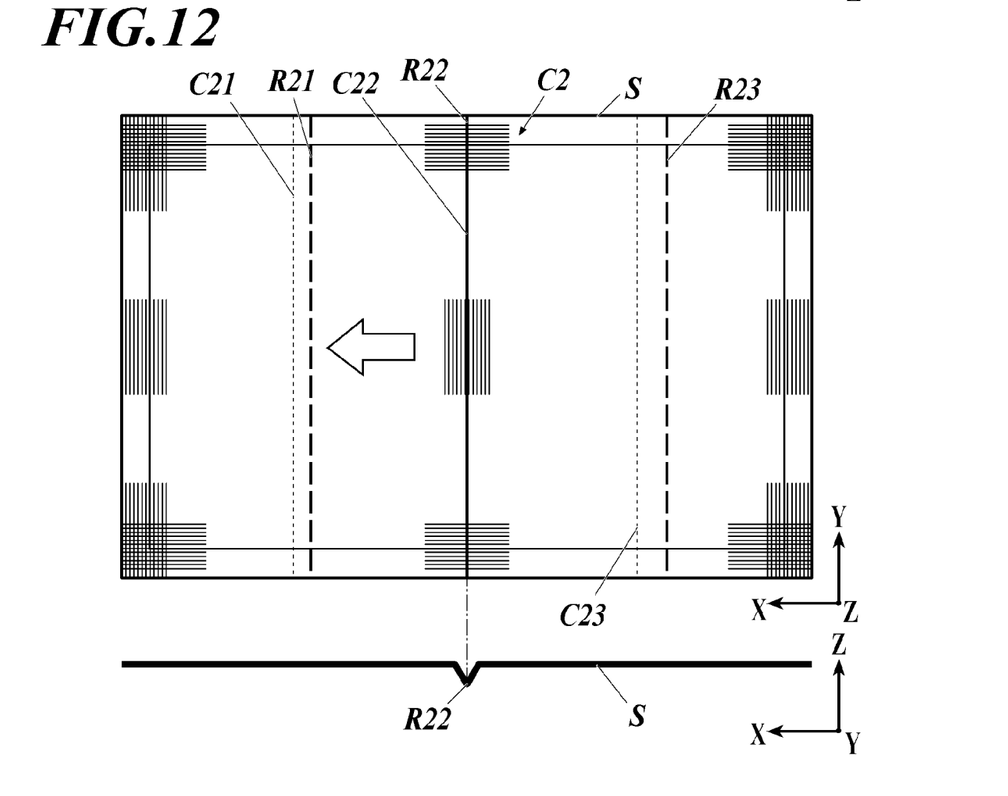
FIG. 12 is a plan view showing a sheet and another example of the adjustment chart output on the paper according to one or more embodiments.

FIGS. 11 to 12 show a sheet S and adjustment charts C1, C2 output on the sheet S. FIG. 12 shows a cross-sectional view of the sheet S, too.

The adjustment chart C1 in FIG. 11 is an adjustment chart in a case where a slitter, an FD sewing machine, and a CD sewing machine are installed in the slots M1, M2, M3, respectively. The adjustment chart C2 in FIG. 12 is an adjustment chart in a case where a slitter, a creaser, and a CD sewing machine are installed in the slots M1, M2, M3, respectively.

The adjustment chart C1 in FIG. 11 includes:
reference lines C11, C12 for perforation in the feed direction; and
a reference line C13 for perforation in the cross direction.

The adjustment chart C2 in FIG. 12 includes:
a reference line C21 for perforation in the cross direction on a condition in which crease processing is not done;
a crease reference line C22; and
a reference line C23 for perforation in the cross direction on a condition in which crease processing is done.

R11-R13 and R21-R23 are examples of actual positions in processing. Sometimes they meet the reference lines and sometimes they don't.

As described above, though the only difference is whether the post-processing module M2 is a creaser or an FD sewing machine, adjustment items required for them are different. Therefore, the controllers 16, 26 determine an adjustment chart suitable for adjustment.

The controllers 16, 26 add output of an image of the adjustment chart to adjustment contents, the adjustment chart corresponding to installation positions of post-processing modules. An example is shown below.

Figure 13:
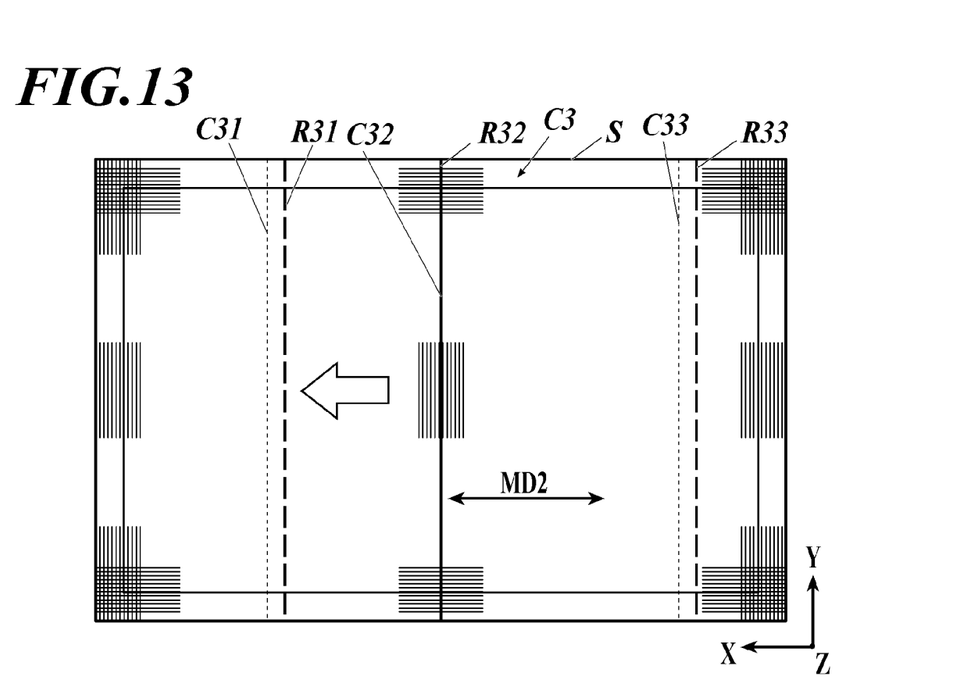
FIG. 13 is a plan view showing a sheet and still another example of the adjustment chart output on the paper according to one or more embodiments.

FIG. 13 shows a case where positions of a creaser and a CD sewing machine are reversed with respect to the case in FIG. 12. The adjustment chart C3 in FIG. 13 is an adjustment chart in a case where a slitter, a CD sewing machine, and a creaser are installed in the slots M1, M2, M3, respectively.

The adjustment chart C2 in FIG. 13 includes:

a reference line C31 for perforation in the cross direction on a condition in which crease processing is not done;

a crease reference line C32; and a reference line C33 for perforation in the cross direction on a condition in which crease processing is done.

R31-R33 are examples of actual positions in processing. Sometimes they meet the reference lines and sometimes they don't.

CD perforation processing (R33) targeting the reference line C33 on a condition in which crease processing is done is performed after crease processing. In a case where there is no reverse sheet feed, after crease processing, a target position for processing by the CD sewing machine (M2) is behind a crease position (M3, R32) by a distance MD2 between modules (in the negative direction along the X coordinate). FIG. 1 also shows the module distance MD2 between the modules M2, M3.

Therefore, a distance between the crease reference line C32 and the reference line C33 of perforation in the cross direction on the condition in which crease processing is done must be longer than the distance MD2 between modules. In FIG. 12, a sheet is fed from a processing position of the creaser (M2), and is placed at a position for processing by the CD sewing machine (M3). Therefore, it is not necessary to keep such a long distance.

The controllers 16, 26 determine an appropriate adjustment chart according to installation positions for the same combination of post-processing modules, for example, as described above.

Advantageous Effects and So On

According to the above embodiments, the post-processing modules M1-M3 selected for post-processing to be applied to an output product S of an image can be freely installed in the post-processing device 20. Configuration of the post-processing device according to the selection and installation is efficiently and appropriately adjusted.

In the above embodiments, the number of post-processing modules that can be freely installed is three. The present invention is not limited to this. The number of post-processing modules that can be freely installed may be two, four, or more.

Types of post-processing modules are not limited to those mentioned above. Various processing modules can be applied.

Adjustment is made also after a post-processing module is replaced by a module of the same type. Such adjustment is necessary because there is difference even between modules of the same type. Therefore, after a module is replaced, adjustment is made no matter whether a combination changes or not, and no matter whether installation positions change or not.

Adjustment may be made also in a case where no module is replaced. This is because changes over time sometimes cause need for adjustment. Adjustments may be made at any time based on determination of the controllers or request of a user.

Detailed configuration of devices constituting the image forming device and detailed operation of the devices can be modified within the scope of the claims of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A sheet-processing device comprising:
   sheet-processing modules that are disposed at installation positions of the sheet-processing device each of the sheet-processing modules executing sheet-processing to a sheet; and
   a controller that:
   detects the sheet-processing modules disposed at the installation positions, and
   after at least one of the sheet-processing modules is replaced in the installation positions, determines an adjustment content of the at least one of the sheet-processing modules based on a detection result.

2. The sheet-processing device according to claim 1, wherein the controller detects at least one of types and at least one of the installation positions of the at least one of sheet-processing modules and determines the adjustment content based on the at least one of the types and the at least one of the installation positions as the detection result.

3. The sheet-processing device according to claim 2, wherein the controller determines an order to adjust the sheet-processing modules based on the types and the installation positions of the sheet-processing modules.

4. The sheet-processing device according to claim 1, wherein the controller makes the adjustment content of the at least one of the sheet-processing modules different from adjustment contents of the remaining sheet-processing modules depending on a combination of the sheet-processing modules.

5. The sheet-processing device according to claim 1, wherein the controller determines an order to adjust the sheet-processing modules depending on a combination of the sheet-processing modules.

6. The sheet-processing device according to claim 1, wherein the adjustment content determined by the controller includes at least one of need for guidance, a guidance method, and guidance contents.

7. The sheet-processing device according to claim 1, wherein
   the controller adds outputting an image of an adjustment chart to the adjustment content, and
   the adjustment chart corresponds to a combination of the sheet-processing modules.

8. The sheet-processing device according to claim 7, wherein
   the controller:
   controls the sheet-processing device to execute sheet-processing with existing adjustment values on the sheet on which the image of the adjustment chart is output, and
   determines additional adjustment contents based on an image obtained by reading the sheet with a scanner.

9. The sheet-processing device according to claim 8, wherein, in a case where the additional adjustment contents include an item of mechanical adjustment that requires an operation by a user, the controller adds guidance for the user on an adjustment method and adjustment values to the additional adjustment contents.

10. The sheet-processing device according to claim 8, wherein the controller automatically revises control values of the sheet-processing modules included in the additional adjustment contents.

11. The sheet-processing device according to claim 1, wherein
the adjustment content includes output of the adjustment chart corresponds to the at least one of the installation positions of the sheet-processing modules.

12. An image forming device, comprising:
an image former that forms images on sheets; and
a sheet-processing device according to claim 1 that executes sheet-processing on the sheets on which the images are formed by the image former.

13. The sheet-processing device according to claim 1, wherein
each of the sheet-processing modules executes a same or different sheet-processing to the sheet.

14. The sheet-processing device according to claim 1, wherein
the sheet-processing modules are disposed within the sheet-processing device.

15. The sheet-processing device according to claim 1, wherein
at least one of the sheet-processing modules is a post-processing module that executes a post-processing to an output of the sheet on which an image is formed.

16. An adjustment method for a sheet-processing device that comprises sheet-processing modules that are disposed at installation positions of the sheet-processing device, each of the sheet-processing modules executing sheet-processing to a sheet, the method comprising:
detecting the sheet-processing modules disposed at the installation positions, and
after determining that at least one of the sheet-processing modules is replaced in the installation positions, determining an adjustment content of the at least one of the sheet-processing modules based on a detection result.

17. A non-transitory computer readable recording medium storing an adjustment program for a computer of a sheet-processing device that comprises sheet-processing modules that are disposed at installation positions of the sheet-processing device, each of the sheet-processing modules executing sheet-processing to a sheet, the program causing the computer to execute:
detecting the sheet-processing modules disposed at the installation positions, and
after determining that at least one of the sheet-processing modules is replaced in the installation positions, determining an adjustment content of the at least one of the sheet-processing modules based on a detection result.

* * * * *